United States Patent [19]

Hoger

[11] Patent Number: 6,065,809
[45] Date of Patent: May 23, 2000

[54] UPHOLSTERY ELEMENT AND MANUFACTURING PROCESS THEREOF

[76] Inventor: Knut Hoger, Sthamerstrasse 47, 22397 Hamburg, Germany

[21] Appl. No.: 09/009,435

[22] Filed: Jan. 20, 1998

[30] Foreign Application Priority Data

Jan. 21, 1997 [DE] Germany ............... 297 00 976 U
Nov. 15, 1997 [DE] Germany ............... 197 50 666

[51] Int. Cl.⁷ .................................................. A47C 7/02
[52] U.S. Cl. ................................. 297/452.5; 297/452.49
[58] Field of Search .................... 297/452.5, 452.49, 297/452.51, 452.54, 452.56; 5/716, 721, 717, 263

[56] References Cited

U.S. PATENT DOCUMENTS

| | | | |
|---|---|---|---|
| 2,836,226 | 5/1958 | Fridolph | 297/452.5 |
| 3,099,844 | 8/1963 | Bolesky | 297/452.5 |
| 3,122,829 | 3/1964 | Schaad et al. | 297/452.5 |
| 3,261,037 | 7/1966 | Cermak et al. | 297/452.49 |
| 3,280,410 | 10/1966 | Propst et al. | 297/452.49 |
| 5,232,266 | 8/1993 | Mork | 297/452.5 |

FOREIGN PATENT DOCUMENTS 889121  12/1971  Canada ............... 297/452.5

*Primary Examiner*—Laurie K. Cranmer

[57] ABSTRACT

The device relates to an upholstery element, in particular for motorcycle seats featuring a substructure and a seat covering. It is suggested that a spring arrangement containing at least one spring, is provided between covering and substructure and connected to the plastic substructure. This design has the advantage that the springs in the arrangement are better able to absorb and cushion vibrations and impacts.

19 Claims, 3 Drawing Sheets

UPHOLSTERY ELEMENT AND MANUFACTURING PROCESS THEREOF

BACKGROUND OF THE INVENTION

The invention relates to an upholstery element, in particular for motorcycle seats.

Conventional motorcycle seats consist of a bowl-shaped plastic substructure, a core of foam material and a covering. For this type of seat to be considered comfortable, the foam core must have a minimum height of 8 cm and width of approx. 25 cm. Vibrations and impact blows are absorbed well only at heights of roughly 10 cm or more. However, the design of many motorcycles calls for a flatter seat, meaning a considerable reduction in the rider's comfort.

It is an object of the invention to design an upholstery element which would enable high comfort levels in a significantly flatter motorcycle seat.

SUMMARY OF THE INVENTION

According to the invention, the object is solved by an upholstery element with the characteristics described in claim 1. The design has the advantage that the positioning of the springs enables better absorption and cushioning of vibrations and impact blows. By varying the number of springs, their arrangement, and strength, the seat may be adapted individually to the weight of the rider or passenger. In particular, it is possible to achieve high levels of comfort in a flat seat. Even a seat height of 4–7 cm can be sufficient, for example. By adjusting the strength of the springs, equal seating comfort may be achieved for heavier riders and/or passengers.

In particular, it is possible to optimise the adaptation using varying arrangements of different springs over the entire area of the seat. Also, it is possible to apply such an arrangement of springs to selected sections of the seat.

The subclaims refer to the further design and manufacture of the upholstery element. It turns out that the desired level of seating comfort may be achieved using four or more springs. Preferably, the springs are to be connected to the substructure by directly thermoplastic deep-drawing of corresponding part of the plastic substructure in or over the bottom part of the springs. This creates a form fitting which firmly holds the springs in place, even under rough operating conditions. The springs can no longer slip. Further, it is possible to fasten the springs on the substructure by welding or riveting.

BRIEF DESCRIPTION OF THE DRAWINGS

The invention is illustrated in the following by means of a schematic drawing. The figures show.

DESCRIPTION OF THE PREFERRED EMBODIMENT

Figure 1:
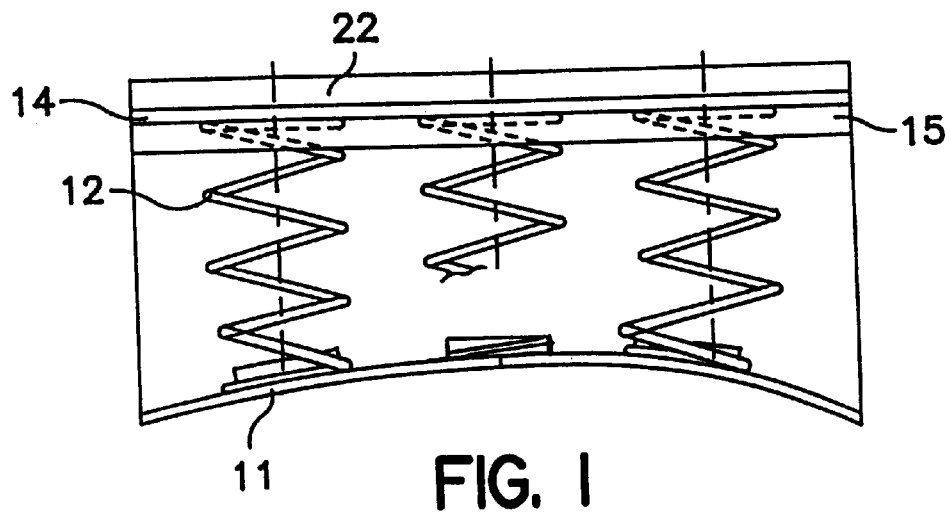
FIG. 1 a side view of an upholstery element according to the invention.
Figure 2:
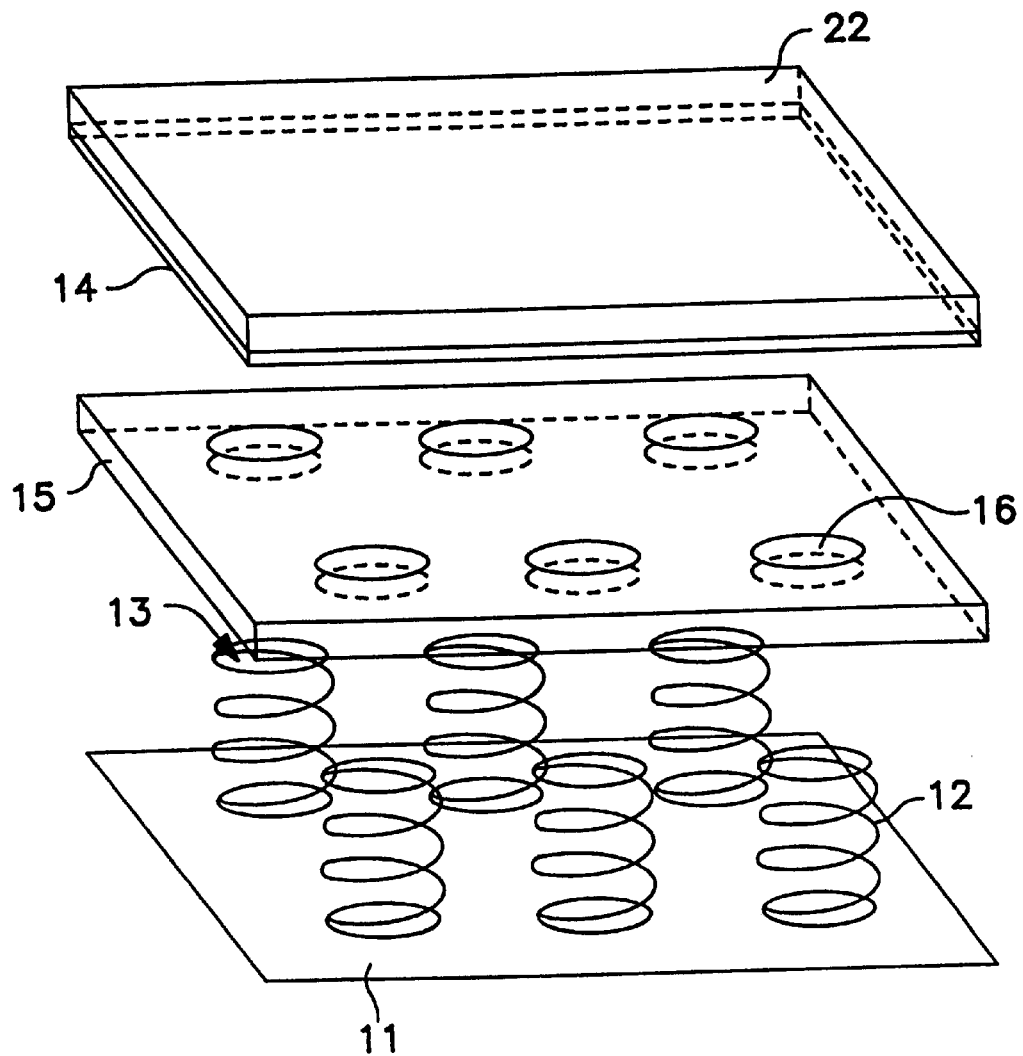
FIG. 2 an exploded view of the element.

The upholstery element comprises a substructure (11) made of a thermoplastic material, on which a number of coil springs (12) have been fixed in a specific arrangement. The plastic substructure might for example be formed into a bowl-like shape with the bottom part corresponding to the frame or seat-receptacle of the motorcycle. The substructure may also be only a part of the seat and connected to the seat frame. Further, it is possible to replace the foam material of a conventional seat by such an upholstery element. The plastic substructure might for example be made from polycarbonate, polyethylene, polypropylene, ABS or other such materials.

The springs (12) in the array may be cylindrical coil springs, and/or barrel springs, and/or waist-shaped springs and/or conical springs. A robust layer of needled felt (14) is applied over the upper end faces (13) of the springs, to prevent the springs from showing through the covering (not shown). An additional foam layer (22) may be put on top of the felt layer, to define the upper contour and equalize it in areas which might not be provided with springs. However, it is also possible to affix the covering, e.g. made from leather, directly to the felt layer.

When using taller springs, e.g. exceeding 40 millimeters, it may be useful to include axial guides to ensure a smooth operation. In the design shown in the drawing, the axial guide is a foam layer (15) glued under the felt layer. In the area of the coil springs, the foam layer comprises appropriate openings (16).

Figure 3:
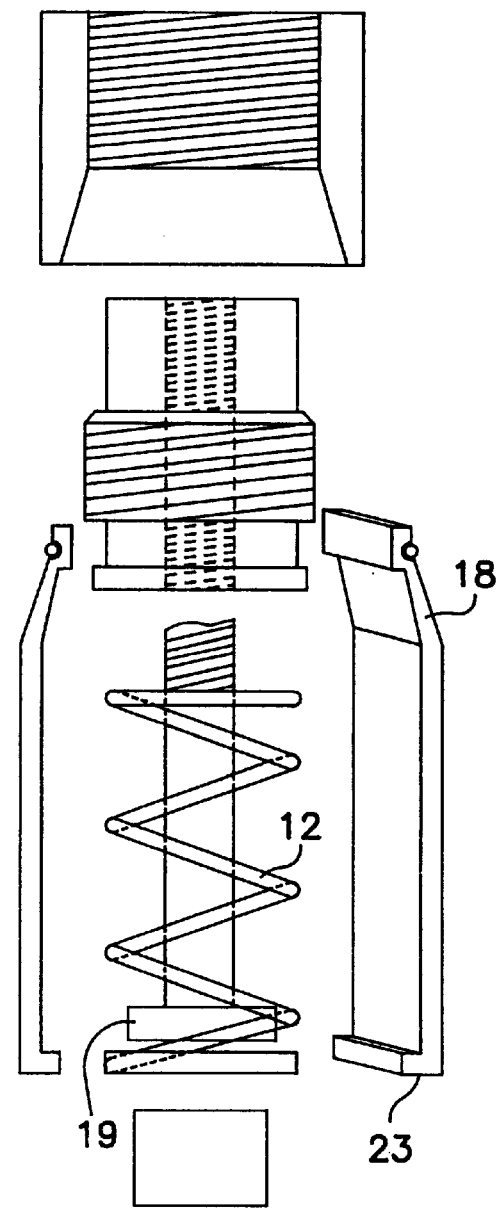
FIG. 3 the tools used in fixing the springs, before assembly.
Figure 3:
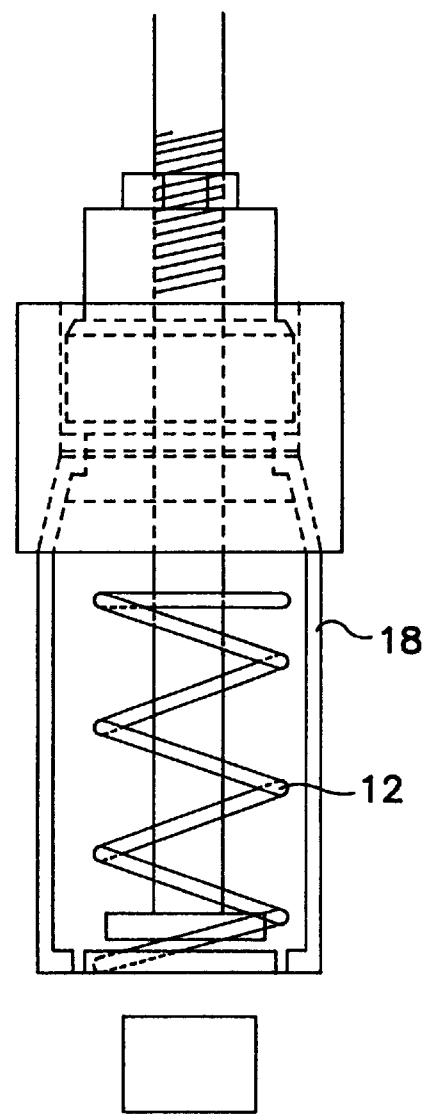
Figure 3:
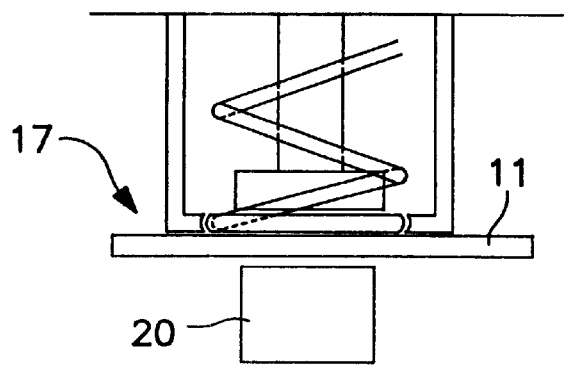
Figure 4:
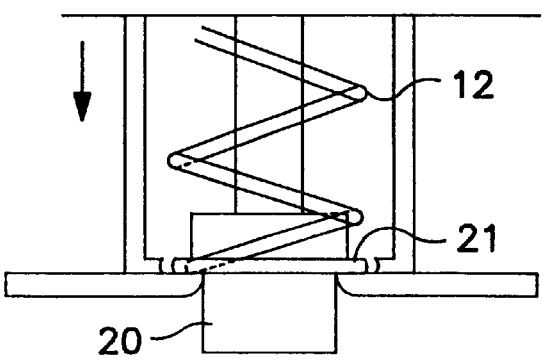
FIG. 4 the tools in FIG. 3, during assembly of the springs.
Figure 5:
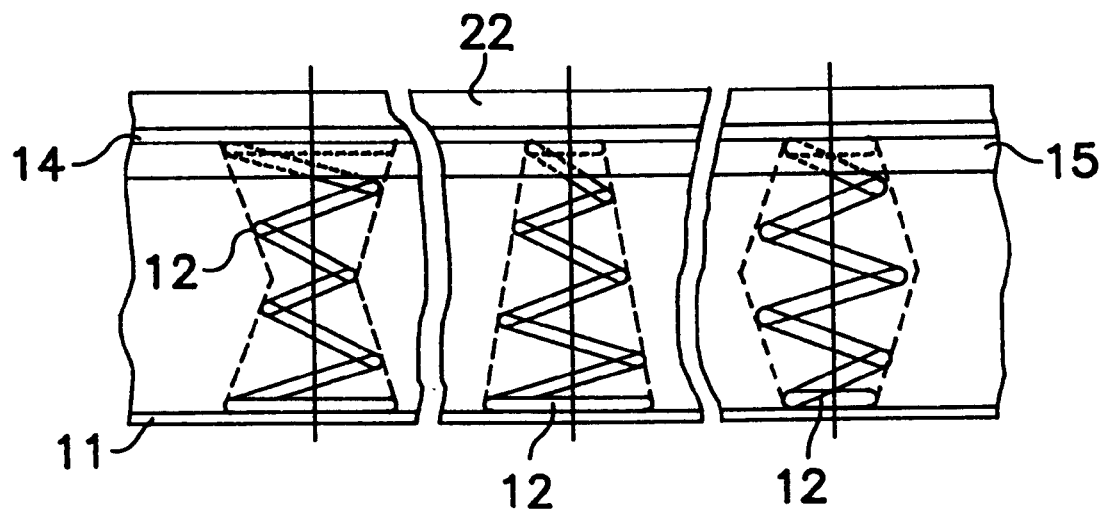
FIG. 5 is an alternate view of an upholstery element according to the invention.
Figure 6:
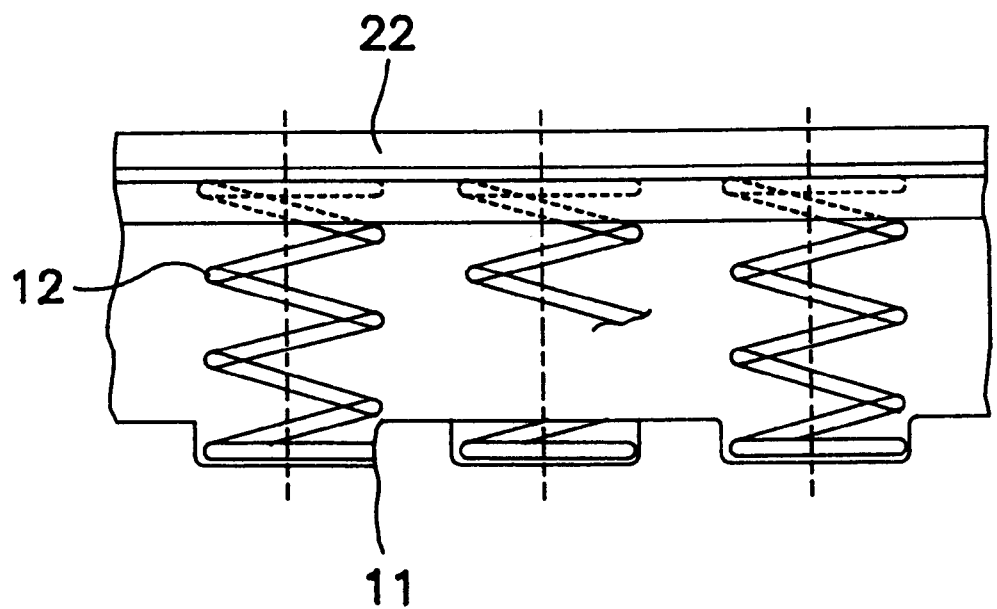
FIG. 6 is another alternate view of an upholstery element according to the invention.

The manufacture of the upholstery element is explained in the following using FIGS. 3 and 4. Prior to assembly, the plastic substructure is more or less level in the area (17) to be affixed to the spring. The spring (12) is held in a tool (18) which more or less completely surrounds the spring. The tool (18) features a stamp (19) concentric to the spring's axle, which operates in conjunction with a counterstay (20) underneath the plastic substructure.

The plastic is heated to a temperature such as 250° C. and the tool is pressed onto the substructure. The front edge (23) of the tool, facing the plastic substructure (11) has an axial distance to the front face of the stamp (19). During the pressing process, this causes the formation of a projection (21) which extends into the inside of the coil spring. In the process, the plastic partially encloses the the spring wire of the bottom part of the spring, so that a firm mechanical hold between the spring and the plastic substructure may be achieved. After the plastic has cooled off and hardened, the tool (18) is opened and removed. The intrusion of the spring into the plastic may also be achieved during the initial shaping of the plastic substructure, or by heating only the relevant areas of the plastic. Further, it is possible to deep-draw projections or recesses containing a thread, onto or into which the coil springs may be screwed.

It turns out that a good comfort level may be achieved using 2–3 millimeter steel wire compression springs with an outer diameter of roughly 30 millimeters. When using conical compression springs, 2 to 3 millimeter steel wire and an outer diameter going from 27 to 35 millimeters may be suitable. The advantage of conical compression springs is that these may be compressed to a greater extent.

Obviously, the measurements of the springs depend on the individual needs of the rider or passenger. For example, it may be sufficient to arrange the springs only in the sitting area, while padding the remainder of the seat in the conventional way with foam material. Especially in the case of larger seats, different areas may be equipped with varying spring strengths.

I claim:

1. An upholstery element for motorcycle seats, comprising a substructure made from thermoplastic material and a covering between which a spring arrangement comprising at least four metal coil springs is provided each spring of which is connected with its lower end to the substructure by a projection formed on the substructure, wherein the total thickness of the upholstery element is not more than 10 cm.

2. The upholstery element according to claim 1, wherein said at least four springs have a shape selected from the group consisting of cylindrical, barrel, waist-shaped and conical.

3. The upholstery element according to claim 1, wherein said lower portion of each of said at least four springs is at least partially enclosed by said projection.

4. The upholstery element according to claim 1, wherein each of said projections has s threaded surface onto which said lower portion of each of said springs is capable of being detachably screwed.

5. The upholstery element according to claim 1, wherein each of said springs has a height of about 2 to about 8 cm.

6. The upholstery element according to claim 5, wherein each of said springs has a height of about 3 to about 5 cm.

7. The upholstery element according to claim 1, wherein said springs are evenly distributed on said substrate.

8. The upholstery element according to claim 1, wherein said substructure has different sections which are provided with springs of varying strengths.

9. The upholstery element according to claim 1, wherein each of said springs has an upper and face; and further comprising a firm, elastic protective layer located between said upper end face and said covering to prevent said springs from showing through said covering.

10. The upholstery element according to claim 9, wherein said protective layer is made of needled felt.

11. The upholstery element according to claim 9, further comprising at least one layer of soft material located between said upper end faces of said springs and said protective layer.

12. The upholstery element according to claim 11, wherein said at least one layer of soft material is made of a foam material.

13. The upholstery element according to claim 1, wherein the upholstery element has a total thickness of about not more than 7 cm.

14. The upholstery element according to claim 13, wherein the upholstery element has a total thickness of about not more than 5 cm.

15. An upholstery element according to claim 1, wherein the substructure is bowl-shaped with a bottom part corresponding to a seat receptacle frame of the motorcycle.

16. An upholstery element for motorcycle seats, comprising a substructure made from thermoplastic material and a covering between which a spring arrangement comprising at least four metal coil springs is provided each spring of which is connected with its lower end to the substructure in a recess formed on the substructure, wherein the total thickness of the upholstery element is not more than 10 cm.

17. The upholstery element according to claim 16, wherein said lower portion of each of said at least four springs is at least partially enclosed by said recess.

18. The upholstery element according to claim 16, wherein each of said recesses has a threaded surface onto which said lower portion of each of said springs is capable of being detachably screwed.

19. An upholstery element according to claim 16, wherein the substructure is bowl-shaped with a bottom part corresponding to a seat receptacle frame of the motorcycle.

* * * * *